Feb. 17, 1970  E. FURRER  3,495,853
JOINT FOR HIGH-PRESSURE PIPELINES OR THE LIKE
Filed Aug. 1, 1967

INVENTOR
Eduard Furrer
BY Michael S. Slitker
ATTORNEY

United States Patent Office 3,495,853
Patented Feb. 17, 1970

3,495,853
JOINT FOR HIGH-PRESSURE PIPELINES OR THE LIKE
Eduard Furrer, 21 Drusbergstrasse,
8053 Zurich, Switzerland
Filed Aug. 1, 1967, Ser. No. 657,595
Claims priority, application Switzerland, June 6, 1967,
7,993/67
Int. Cl. F16l *17/02*
U.S. Cl. 285—81                                    14 Claims

ABSTRACT OF THE DISCLOSURE

The end portions of two coaxial pipes in a pipe joint are provided with external annular beads disposed between internal annular collars provided at the axial ends of a composite outer sleeve which comprises several trough-shaped sections. The sections of the outer sleeve are held against radial movement away from the pipes by one or more clamping rings which can be locked in selected axial positions. The outer sleeve accommodates an inner sleeve which receives the open ends of the pipes and has internal annular grooves for elastic sealing rings. These sealing rings are deformed when the pressure in the pipes rises and provide fluid-tight seals between the peripheral surfaces of the pipes and the inner sleeve. The fluid pressure also causes the beads to bear against the collars whereby the outer sleeve holds the pipes against axial movement away from each other. The pipes may but need not have identical internal and/or external diameters.

BACKGROUND OF THE INVENTION

The present invention relates to joints in general, and more particularly to improvements in connections or joints between metallic pipes which can be used to convey highly compressed or pressurized gaseous or liquid fluids.

Certain presently known joints for pipes or hoses in high-pressure lines comprise pairs of nipples each of which must be connected to one end of a pipe or hose, and at least two connecting elements (normally in the form of threaded sleeves) which are employed to connect the nipples to each other. Sealing elements are interposed between the nipples and the pipes and/or between the nipples and the sleeves. A serious drawback of such joints is that the establishment of sufficiently strong mechanical connections between the pipes and the respective nipples presents many problems and necessitates the use of precision-finished parts. Furthermore, such joints do not permit turning of interconnected pipes relative to each other or any, even minimal, swiveling of one pipe with reference to the other pipe or with reference to the remainder of the joint. Still further, such conventional joints can only be assembled or taken apart with attendant axial movement of the pipes even though it is normally desirable that such assembly or dismantling should be possible by moving the pipes sideways into and from axial alignment. Another drawback of just mentioned conventional joints is that each pipe must be connected to a differently configurated or dimensioned part which means that the components of the joint must be produced in different machines or in different dies or molds. All this contributes to the cost of the joint and complicates the assembling and dismantling work. Finally, such conventional joints are likely to become loose in response to intermittent or continuous vibratory or like movements.

SUMMARY OF THE INVENTION

It is an object of my invention to provide a novel and improved joint which comprises a small number of simple and rugged parts, wherein the ends of the pipes or like tubular members need not be mechanically and permanently connected with nipples or like parts, which can be assembled and dismantled without resorting to any tools or by resorting to rudimentary and/or readily available tools, which can be used to couple pipes of identical or different internal and/or external diameters, and which can be reused as often as desired.

Another object of the invention is to provide a pipe joint which allows for turning of one pipe relative to the other pipe or vice versa, which can be designed to allow for swiveling of pipes relative to each other, which occupies little room, particularly in the radial direction, and which can be placed close to or into immediate proximity of a branch, elbow or other arcuate or otherwise configurated nonstraight portion of a pipe.

A further object of the invention is to provide a joint which can readily withstand extremely high pneumatic or hydraulic stresses, which can resist corrosion, which can be manipulated by persons having little technical skill, which can be readily secured and locked in assembled condition to prevent accidental leakage of fluid from the pipes, and which can be assembled or taken apart by necessitating only radial but no axial movements of the pipes so that the pipes need not be disconnected from other parts of a pipe line.

Briefly outlined, one feature of my invention resides in the provision of a joint which comprises a pair of tubular members having open ends adjacent to each other and preferably serving to convey gaseous or liquid fluids which are maintained at elevated pressure. The tubular members are provided with external projections flanking an inner sleeve which is provided with internal annular grooves for elastic sealing rings each of which engages with the peripheral surface of one of the tubular members. The inner sleeve is received in an internal annular recess of an outer sleeve which has inwardly extending projections engaging the external projections of the tubular members to hold the latter against axial movement away from each other. The outer sleeve comprises several trough-shaped sections which are assembled to form a cylindrical body and are held against movement radially and away from the tubular members by one or more annuli which are slipped onto the outer sleeve and may be releasably locked thereto.

Each external projection is preferably constituted by a circumferentially complete bead of the respective tubular member and each inwardly extending projection is preferably constituted by a circumferentially complete collar of the outer sleeve. This enables the tubular members to rotate with reference to each other. In order to take the joint apart, the annulus or annuli are slipped off the outer sleeve whereby the sections of the outer sleeve can move apart to expose the inner sleeve. Each tubular member is then readily withdrawable from the inner sleeve.

The novel features which are considered as characteristic of the invention are set forth in particular in the appended claims. The improved joint itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
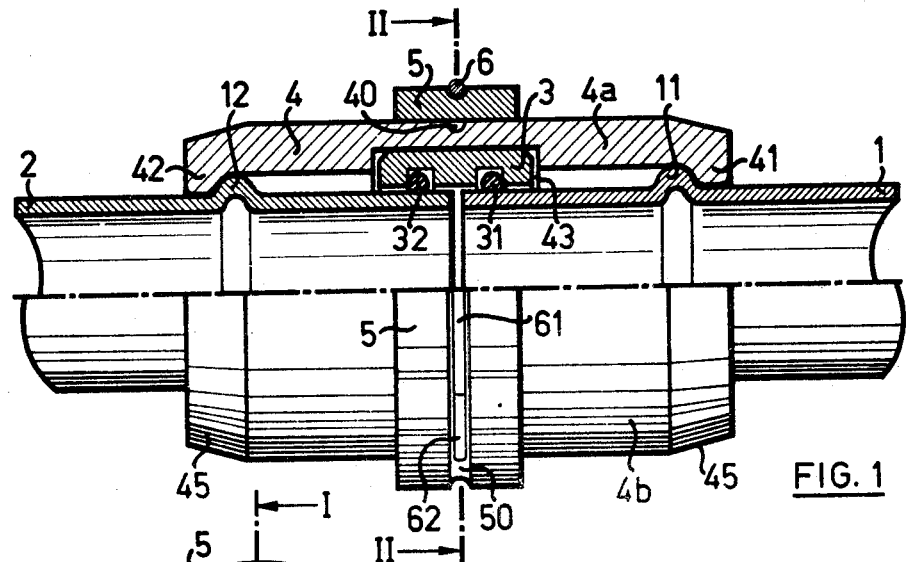
FIG. 1 is a partly elevational and partly axial sectional view of a joint which embodies one form of my invention, the section being taken in the direction of arrows as seen from the line I—I of FIG. 2.
Figure 2:
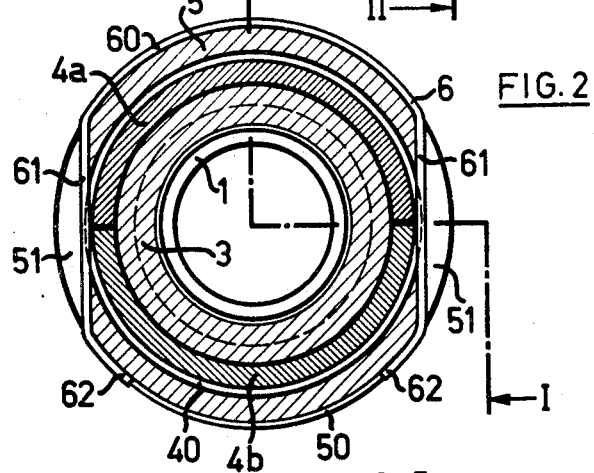
FIG. 2 is a transverse sectional view as seen in the direction of arrows from the line II—II of FIG. 1.

Referring first to FIGS. 1 and 2, there is shown a pipe joint which comprises two strongly pressure-resistant seamless tubular members 1 and 2 (hereinafter called pipes for short) each of which is preferably made of steel, copper or other suitable metallic material and is provided with a smooth peripheral surface. These pipes may be manufactured by drawing and may be utilized in high-pressure pipe lines of hydraulic or pneumatic apparatus. For example, the external diameters of the pipes 1 and 2 may be in the range of 6–30 mm. In assembling the joint, the open ends of the pipes 1 and 2 are placed adjacent to each other so that their axes coincide. In the embodiment of FIGS. 1 and 2, the external and internal diameters of the two pipes are identical.

The pipes 1 and 2 are respectively provided with external projections in the form of circumferentially complete beads 11 and 12. These beads are preferably but need not be disposed at the same axial distance from the adjoining open ends of the pipes 1, 2 and each thereof may be formed by subjecting the respective pipe to a very high internal pressure which causes an annular portion of the pipe to bulge radially outwardly and to thus form the respective bead. For example, the end portion of each pipe may be placed into the cavity of a mold whose internal surface is formed with a groove dimensioned to accommodate the bead 11 or 12. The interior of the pipe is then subjected to the pressure of a hydraulic fluid (for example, the fluid pressure may be raised to between 3,000–4,000 atmospheres) whereby the pipes develop beads in response to outward displacement of such material which is adjacent to the groove in the respective mold. The high fluid pressure is maintained for a relatively short period of time and should be high enough to stress the material of pipes to the flow limit.

The joint further comprises an inner sleeve 3 and an outer sleeve 4. The inner sleeve 3 consists of metallic material and surrounds the open ends of the pipes 1 and 2. The internal surface of this inner sleeve 3 is formed with two annular grooves 3a, 3b each of which accommodates a deformable sealing ring (31, 32) preferably consisting of rubber or other suitable elastomeric material. The sealing rings 31, 32 respectively surround the peripheries of the pipes 1, 2 and are received in the grooves 3a, 3b with some freedom of axial movement. Each pipe is preferably received in the inner sleeve 3 with limited freedom of swiveling movement and is free to rotate with reference to the inner sleeve. When the pipes 1 and 2 convey or confine a strongly compressed gaseous fluid or a highly pressurized hydraulic fluid, the fluid penetrates between the open ends of the pipes and deforms the sealing rings 31, 32 into strong sealing engagement with the inner sleeve 3 and with the peripheral surfaces of the respective pipes. It was found that such mode of sealing reliably prevents escape of any fluid, i.e., the material of the rings 31, 32 is caused to penetrate into the annular clearances between the peripheral surfaces of the respective pipes 1, 2 and the axial ends of the inner sleeve 3 to invariably prevent leakage beyond the inner sleeve.

The function of the outer sleeve 4 is to hold the inner sleeve 3 against axial displacement with reference to the pipes 1, 2 and to hold these pipes against axial movement away from each other. The outer sleeve 4 comprises several substantially trough-shaped sections. In the embodiment of FIGS. 1 and 2, this outer sleeve 4 is assembled of two semicylindrical sections or shells 4a, 4b whose axially parallel edge faces abut against each other so that the sections 4a, 4b together form a composite cylinder. The internal surface of this outer sleeve 4 is formed with an annular recess 43 which receives, preferably with some axial and radial clearance, a portion of the inner sleeve 3 so that the latter invariably surrounds the open ends of the pipes 1 and 2. The outer sleeve 4 is further provided with two internal projections 41, 42 which form two inwardly extending collars and overlap the beads 11, 12 to thereby hold the pipes 1, 2 against axial movement away from each other. In other words, the beads 11, 12 are disposed between the collars 41, 42. Each of these collars comprises two arcuate portions which form integral parts of the sections 4a, 4b. The collars 41, 42 may but need not be located at the extreme axial ends of the outer sleeve. The sections 4a, 4b are preferably made of steel and are preferably produced by cold forming so that each thereof exhibits a very strong resistance to mechanical deforming stresses.

The joint also comprises clamping means for holding the sections 4a, 4b against movement radially of and away from the pipes 1, 2, and locking means for releasably holding the clamping means against movement axially of the outer sleeve. In the embodiment of FIGS. 1 and 2, the clamping means comprises a single annulus 5 of high-quality steel or the like which can be locked substantially midway between the axial ends of the outer sleeve 4 so that it surrounds the inner sleeve 3. The annulus 5 is fitted onto the outer sleeve 4 with minimal clearance and its axial length may be but a fraction of the axial length of the outer sleeve. In order to facilitate the slipping of annulus 5 onto or off the outer sleeve 4, the latter is preferably provided with chamfered end portions 45 which surround the collars 41, 42.

The locking means for the clamping annulus 5 comprises a substantially U-shaped locking member 6 which can be made of spring steel wire or other suitable elastic material and engages with the annulus 5 as well as with the outer sleeve 4 so that the annulus is held against movement from a predetermined axial position. The outer sleeve has an external circumferentially complete annular channel or groove 40 which is coplanar with an external annular groove 50 of the annulus 5. The latter is further provided with two tangential slots 51 which extend inwardly of the groove 50 and communicate with the groove or channel 40. The locking member 6 comprises an arcuate median portion 60 which is received in the groove 50 at one side of the slots 51 and two end portions 61 each of which extends into one of the slots 51 as well as into the adjoining portion of the channel 40. The tips 62 of the end portions 61 extend into the groove 50 at the other side of the slots 51. In this way, the locking member 6 engages with the annulus 5 as well as with the outer sleeve 4 and holds the annulus against any uncontrolled axial movement. The end portions 61 of the locking member 6 tend to move nearer to each other so that they remain in the slots 51 and extend into the groove 40 when the locking member is released upon coupling to the parts 4 and 5.

When the interior of the pipe line which includes the pipes 1, 2 is under elevated pressure, the fluid acts against the end faces of the pipes and tends to push them apart. This causes the beads 11, 12 to bear against the collars 41, 42 of the outer sleeve 4 but the latter cannot yield in any direction because its sections 4a, 4b are held together by the clamping annulus 5. The locking member 6 is not subjected to any stresses because it engages solely with the parts 4 and 5 and because the part 5 is fitted tightly onto the outer sleeve. The sole purpose of this locking member 6 is to hold the annulus 5 in a selected axial position.

It is clear that the clamping means may comprise two or more annuli, for example, two annular members 5 each of which is then placed adjacent to one axial end of the outer sleeve 4. The pipes 1, 2 can be rotated with reference to each other because their peripheral surfaces are preferably smooth and because the beads 11, 12 cannot interfere with such angular movement. Furthermore, and since the inner sleeve 3 can be mounted on the end portions of pipes 1, 2 with some radial clearance (clearly shown in FIG. 1), the pipes are also free to swivel (within limits) relative to each other. The extent of swiveling movement will be determined by the sealing rings 31, 32 and/or by the inner sleeve 3. Since the locking member 6 is nearly entirely concealed in the grooves 40, 50 and slots 51, the radial dimensions of the joint are relatively small, i.e., they need not exceed the diameter of the annulus or annuli 5.

In order to take the joint apart, an operator will pry the locking member 6 loose so that the annulus 5 can be shifted axially beyond the one or the other axial end of the outer sleeve 4. The sections 4a, 4b are then free to move apart and the pipes 1, 2 can be withdrawn from the inner sleeve 3. If desired, the locking member 6 can be disengaged from the outer sleeve 4 in response to a slight impact against the one or the other end face of the annulus 5. It is clear that the joint may be provided with additional locking means to positively hold the member 6 against uncontrolled movement out of the groove 40. However, it was found that the locking member 6 is capable of preventing uncontrolled axial movements of the annulus 5 beyond the one or the other chamfered end portion 45 of the outer sleeve 4.

Figure 3:
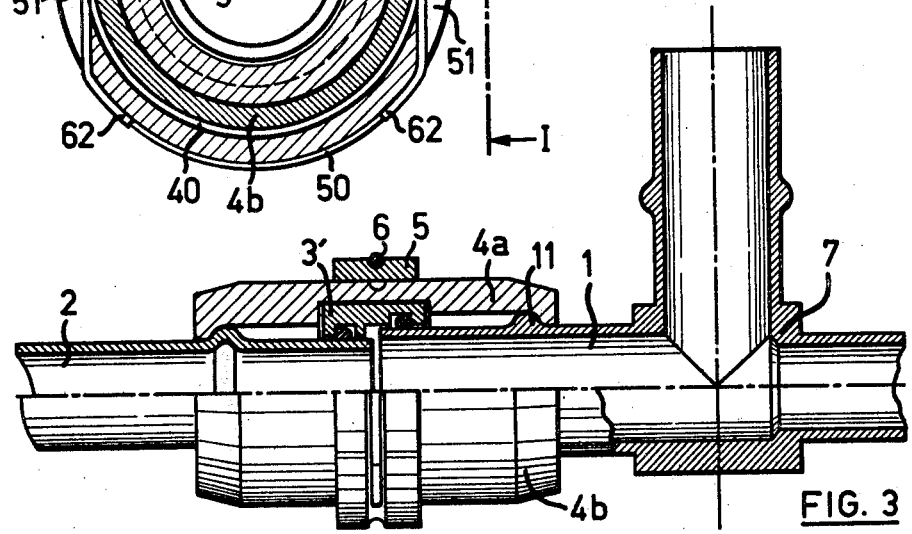
FIG. 3 is a partly elevational and partly axial sectional view of a modified joint.

Referring finally to FIG. 3, there is shown a modified joint which is used to couple two tubular members 1', 2' of different external and internal diameters. The internal surface of the inner sleeve 3' has two portions of different diameters and each such portion is provided with one of the grooves 3a', 3b'. The outer sleeve 4' comprises two or more trough-shaped sections (only two sections 4a', 4b' are shown) and its left-hand collar 42' has an internal diameter which is smaller than that of the right-hand collar 41'. These collars respectively engage the beads 12', 11' of the tubular members 2', 1'. The construction and mounting of the clamping annulus 5 and locking member 6 are identical with the construction and mounting of the corresponding parts in the joint of FIGS. 1 and 2. The tubular member 1' has a branch 7 which is closely adjacent to the bead 11'. All that counts is to place the branch 7 at such a distance from the bead 11' that the annulus 5 can be slipped off the right-hand axial end of the outer sleeve 4' provided, of course, that the annulus cannot be moved beyond the left-hand end of the outer sleeve. In the emobdiment of FIG. 3, the distance between the right-hand axial end of the outer sleeve 4' and the branch 7 is just sufficient to provide room for the annulus 5.

When the joint of FIGS. 1-2 or FIG. 3 is taken apart, the open ends of the tubular members 1, 2 or 1', 2' can be readily moved sideways, i.e., they need not be moved axially and away from each other. Sidewise movement of the one or the open end will be necessary if the operator wishes to remove the inner sleeve 3 or 3' and if the tubular members 1, 2 or 1', 2' cannot be moved axially and away from each other. In order to reassemble the joint, and if the tubular members cannot move axially, the operator again moves the open end of one tubular member sideways so that he can slip the inner sleeve onto the one or the other open end and that he can also slip the annulus or annuli 5 onto one of the tubular members. The remainder of the assembling operation can be carried out while the two tubular members are in axial alignment with each other. The external projections or beads of the tubular members and/or the internal projections or collars of the outer sleeve 4 and 4' need not be machined or finished with a high degree of precision because they need not perform any sealing function. Some turning and swiveling of tubular members is often desirable in vehicles or other types of machines or apparatus wherein the tubular members are subjected to shaking, vibration or similar stresses. In contrast to the aforedescribed conventional joints, the joint of my invention need not be provided with nipples which are mechanically connected to the ends of tubular members.

The sealing rings are commercially available products and the remaining parts of the joint can be readily produced by cold forming or by resorting to other well known mass producing operations.

The improved joint constitutes an improvement over all such joints which utilize threaded connectors or wherein the ends of tubular members are permanently connected to each other by means of sleeves which are deformed to prevent detachment from the tubular members.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended.

What is claimed as new and desired to be protected by Letters Patent is set forth in the appended claims.

What is claimed is:

1. A joint comprising a pair of tubular members having open ends adjacent to each other and each provided with an external projection adjacent to the respective open end; a one-piece inner tubular sleeve surrounding said open ends intermediate said projections and having an inner circumferential surface provided with axially spaced internal annular grooves each adjacent to the periphery of one of said members and each having a predetermined cross-sectional area; deformable sealing rings in said grooves and each having a cross-sectional area smaller than that of the associated groove; a plurality of substantially trough-shaped sections together forming an outer sleeve surrounding said inner sleeve, each section having internal projections overlapping said external projections with said external projections being located between said internal projections, said sections together having an internal surface provided with an annular recess in which said one-piece inner sleeve is accommodated; and annular clamping means surrounding said outer sleeve to hold said sections against movement radially of and away from said tubular members.

2. A joint as defined in claim 1, said tubular members being provided with smooth peripheral surfaces and each of said external projections comprising a circumferentially complete bead forming an integral part of the respective tubular member; and wherein said clamping means comprises an annulus surrounding said outer sleeve centrally thereof whereby to press said sealing rings equally against the respectively associated tubular members.

3. A joint as defined in claim 1, wherein said sections have abutting edge faces extending in substantail parallelism with the axis of said outer sleeve.

4. A joint as defined in claim 1, wherein said internal projections are constituted by annular collars provided at the axial ends of said outer sleeve.

5. A joint as defined in claim 1, wherein said sealing rings consist of elastomeric material and wherein said inner sleeve surrounds said tubular members with at least some clearance.

6. A joint as defined in claim 1, wherein said annulus surrounds said outer sleeve with minimal clearance and is movable axially beyond at least one end of said outer sleeve.

7. A joint as defined in claim 6, further comprising locking means for releasably holding said annulus against axial movement with reference to said outer sleeve.

8. A joint as defined in claim 7, wherein said outer sleeve has an external channel and said annulus is provided with at least one slot in communication with said channel, said locking means comprising a locking member having a portion extending into said slot and into said channel.

9. A joint as defined in claim 8, wherein said channel is constituted by a circumferentially complete groove in the periphery of said outer sleeve, said annulus having a circumferentially complete groove provided in the periphery thereof and comprising two slots located diametrically opposite each other, each of said slots extneding inwardly from the groove of said annulus and communicating with the groove of said outer sleeve, said locking member comprising a clip of elastomeric material having a median portion received in the groove of said annulus at one side of said slots and two end portions, each of said end portions extending in part through one of said slots into the groove of said outer sleeve and in part into the groove of said annulus at the other side of said slots.

10. A joint as defined in claim 1, wherein the external diameters of said tubular members are identical.

11. A joint as defined in claim 1, wherein the external diameters of said tubular members are different.

12. A joint as defined in claim 1, wherein said tubular members, said sleeves and said clamping means consist of metallic material.

13. A joint as defined in claim 1, wherein said tubular members are rotatable with reference to each other and with reference to said sleeves.

14. A joint as defined in claim 1, wherein each of said tubular members has limited freedom of swiveling movement with reference to said inner sleeve.

References Cited

UNITED STATES PATENTS

| | | | |
|---|---|---|---|
| 1,214,985 | 2/1917 | Barber | 285—373 |
| 3,052,491 | 9/1962 | Grass | 285—373 |
| 3,149,362 | 9/1964 | Smithson | 285—373 |

DAVID J. WILLIAMOWSKY, Primary Examiner

W. L. SHEDD, Assistant Examiner

U.S. Cl. X.R.

285—108, 205, 373, 419